United States Patent
Harley et al.

(10) Patent No.: US 7,576,726 B2
(45) Date of Patent: Aug. 18, 2009

(54) DUAL-POSITIONING CONTROLLER AND METHOD FOR CONTROLLING AN INDICIUM ON A DISPLAY OF AN ELECTRONIC DEVICE

(75) Inventors: Jonah A. Harley, Mountain View, CA (US); Dale W. Schroeder, Scotts Valley, CA (US)

(73) Assignee: Avago Technologies ECBU IP (Singapore) Pte. Ltd., Singapore (SG)

( * ) Notice: Subject to any disclaimer, the term of this patent is extended or adjusted under 35 U.S.C. 154(b) by 631 days.

(21) Appl. No.: 11/136,939

(22) Filed: May 25, 2005

(65) Prior Publication Data
US 2006/0267934 A1 Nov. 30, 2006

(51) Int. Cl.
*G06F 3/033* (2006.01)
(52) U.S. Cl. ...................................... 345/157; 345/159
(58) Field of Classification Search ................ 345/156, 345/157, 160–163, 167, 168–169; 715/856
See application file for complete search history.

(56) References Cited

U.S. PATENT DOCUMENTS

| 4,891,632 | A | * | 1/1990 | Chang | 345/165 |
| 5,187,776 | A | * | 2/1993 | Yanker | 715/800 |
| 5,760,764 | A | * | 6/1998 | Martinelli | 345/160 |
| 5,914,702 | A | * | 6/1999 | Derocher et al. | 345/157 |
| 6,084,570 | A | | 7/2000 | Milroy | |
| 6,489,948 | B1 | | 12/2002 | Lau | |
| 6,681,268 | B1 | | 1/2004 | Kikuchi et al. | |

FOREIGN PATENT DOCUMENTS

| EP | 1507195 | 2/2005 |
| GB | 2316844 | 3/1998 |

* cited by examiner

*Primary Examiner*—Amr Awad
*Assistant Examiner*—Stephen G Sherman (57) ABSTRACT

A dual-positioning controller includes a two positioning controllers for controlling movement of an indicium, such as a cursor, on a display of an electronic device. A coarse controller controls coarse movement of the indicium relative to content displayed on the display. A fine controller controls fine movement of the indicium relative to the content on the display.

13 Claims, 4 Drawing Sheets

DUAL-POSITIONING CONTROLLER AND METHOD FOR CONTROLLING AN INDICIUM ON A DISPLAY OF AN ELECTRONIC DEVICE

BACKGROUND OF THE INVENTION

Traditional cursor control devices for controlling movement of a cursor on a display of an electronic device include arrow keys, function keys, mice, track balls, joysticks, j-keys, touchpads, touch screens, light pens, tablets and other similar devices for controlling cursor movement and selecting items or functions on the display. Although these traditional cursor control devices are generally satisfactory for many applications, in environments in which the cursor control device must operate in a limited workspace and fit within the form factor of an electronic device, such as a laptop computer, personal digital assistant (PDA), wireline or wireless telephone, video game or other similar electronic device, traditional cursor control devices do not provide sufficient cursor control speed or accuracy.

In addition, many compact electronic devices suffer from small dynamic range, limited by either available space or human precision. For example, the capacitive workspace on a touchpad positioning controller of a laptop computer usually is not able to be accurately mapped to the entire laptop display with sufficient pixel-level resolution. As a result, either multiple swipes are necessary to navigate the full screen, or cursor acceleration algorithms are required that are often difficult to control.

Recently, puck-type pointing devices have been introduced to the laptop and hand held device industries to overcome many of the limitations of earlier cursor control devices. Puck-type pointing devices are compact puck-shaped devices that may be manipulated by a user's finger to move within a puck field of motion. The position of the puck in the puck field of motion is sensed using a variety of electrical, electromagnetic and optical techniques, and the position of the puck is mapped to a cursor position on a display. Examples of puck-type pointing devices are described in U.S. Pat. No. 6,084,570 to Milroy, entitled "Compact Cursor Controller Structure For Use With Laptop, Notebook and Hand-Held Computers and Keyboards," U.S. Pat. No. 5,771,037 to Jackson, entitled "Computer Display Cursor Controller," U.S. Pat. No. 6,278,440 to Katsurahira et al., entitled "Coordinate Input Apparatus and Position-Pointing Device," and U.S. patent application Ser. No. 10/723,957 of Harley et al., entitled "Compact Pointing Device."

However, puck-type pointing devices also suffer from small dynamic range when used in conjunction with large displays, such as those found on laptop computers and PDAs. There is therefore a need for a positioning controller on an electronic device that provides improved dynamic range with sufficient cursor control speed and accuracy.

SUMMARY OF THE INVENTION

Embodiments of the present invention provide a dual-input positioning controller including two controllers for controlling movements of an indicium, such as a cursor, on the display of an electronic device. A coarse controller controls coarse movement of the indicium relative to content displayed on the display. A fine controller controls fine movement of the indicium relative to the content on the display.

In one embodiment, the indicium comprises a cursor displayed on the display. The coarse controller controls a first relative motion parameter, while the fine controller controls a second relative motion parameter. In an exemplary embodiment, the first relative motion parameter is the velocity of the cursor on the display and the second relative motion parameter is an incremental change in position of the cursor on the display. Thus, a displacement of the coarse controller produces movement of the cursor on the display at a velocity determined by the displacement distance of the coarse controller and in a direction determined by the displacement direction of the coarse controller, while a displacement of the fine controller produces incremental movement of the cursor from an original position to a new position on the display determined by the displacement distance and displacement direction of the fine controller.

In another exemplary embodiment, both the first relative motion parameter and the second relative motion parameter are incremental changes in position of the cursor on the display. However, the relative positioning resolution between the first and second relative motion parameters differs, such that a displacement of the coarse controller results in a coarse movement of the cursor on the screen, while an identical displacement of the fine controller results in a fine movement of the cursor on the screen. Thus, the first relative motion parameter has a first gain for producing a first incremental change in position of the cursor on the display, and the second relative motion parameter has a second gain less than the first gain for producing a second incremental change in position of the cursor on the display.

In yet another exemplary embodiment, both the first relative motion feature and the second relative motion feature are velocities of the cursor on the display. However, the velocity resolution between the first and second relative motion parameters differs, such that a displacement of the coarse controller results in a coarse movement of the cursor on the screen, while an identical displacement of the fine controller results in a fine movement of the cursor on the screen. Thus, the first relative motion parameter has a first gain for producing a first velocity of the cursor on the display, and the second relative motion parameter has a second gain less than the first gain for producing a second velocity of the cursor on the display.

In another embodiment, the indicium includes a first indicium element comprising a window displayed on the display and a second indicium element comprising a cursor displayed on the display. The first relative motion parameter is a change in position of the window relative to the content on the display, while the second relative motion parameter is a change in position of the cursor within the window. In an exemplary embodiment, the window area is less than the screen area on the display, such that the first relative motion parameter controls the position of the window on the screen. For example, content displayed within the window can be magnified relative to the content displayed outside of the window. In another exemplary embodiment, the window area is less than a virtual area of content, such that the first relative motion parameter controls the position of the content relative to the window. Thus, a displacement of the coarse controller produces an apparent movement of the underlying content on the display to the user, while a displacement of the fine controller produces movement of the cursor on the display.

BRIEF DESCRIPTION OF THE DRAWINGS

The disclosed invention will be described with reference to the accompanying drawings, which show important sample embodiments of the invention and which are incorporated in the specification hereof by reference, wherein.

DETAILED DESCRIPTION OF THE EXEMPLARY EMBODIMENTS

Figure 1:
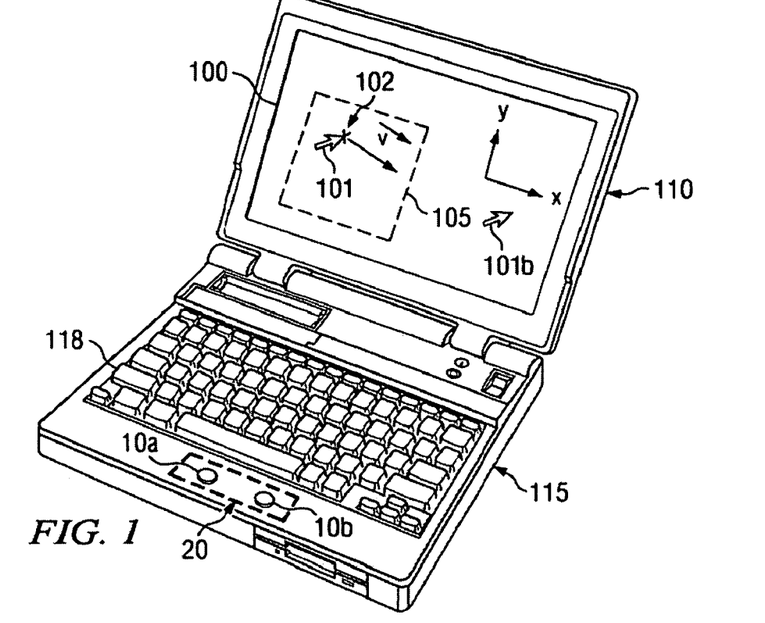
FIG. 1 is a pictorial representation of an exemplary electronic device including a dual-positioning controller for controlling movement of an indicium on a display thereof, in accordance with embodiments of the present invention.

FIG. 1 is a pictorial representation of an electronic device 110 implementing an exemplary dual-positioning controller 20 for controlling movement of an indicium (e.g., a cursor 101) on a display 100 of the electronic device 110, in accordance with embodiments of the present invention. The electronic device 110 shown in FIG. 1 is a laptop computer. However, it should be understood that the present invention is applicable to any type of electronic device 110 in which a dual-positioning controller 20 is operable to control movement of the indicium on the display 100 of the electronic device 110. For example, various electronic devices 110 include wireless (cellular) telephones, personal digital assistants (PDAs), notebooks, hand-held video game devices, remote controls, portable music players or other similar electronic devices. In the example shown in FIG. 1, the indicium whose position is controlled by the dual-positioning controller 20 is a cursor 101. Examples in which other indicia are controlled by the dual-positioning controller 20 will be described in more detail below in connection with FIGS. 7-8.

The dual-positioning controller 20 in FIG. 1 is shown located on a top surface 115 of the electronic device 110. However, it should be understood that in other embodiments, the dual-positioning controller 20 can be located on a side surface or bottom surface of the electronic device 110, or for other types of electronic devices, can be located on a different device in communication with the electronic device 110. For example, the dual-positioning controller 20 can be located on a mouse-type device, a remote control, a keyboard or other similar device. The dual-positioning controller 20 is operable to control the position of the cursor 101 on the display 100 of the electronic device 110.

The dual-positioning controller 20 shown in FIG. 1 includes two positioning controllers 10a and 10b. Each positioning controller 10a and 10b is any type of positioning controller. For example, in one embodiment, each positioning controller 10a and 10b is a puck-type pointing device that includes a puck that is moveable in response to a force applied in a direction generally parallel to the top surface 115 of electronic device 100, hereinafter termed a "lateral" force applied to the puck. The magnitude and direction of movement of the puck determines the magnitude and direction of movement of the cursor 101 on the display 100. In other embodiments, the positioning controllers 10a and 10b include joysticks, j-keys, touchpads, trackballs or other similar analog positioning controllers.

One positioning controller (e.g., positioning controller 10a) is a coarse controller controlling coarse movements of the indicium (e.g., cursor 101) on the display 100 and the other positioning controller (e.g., positioning controller 10b) is a fine controller that controls fine movements of the indicium (e.g., cursor 101) on the display 100. Thus, the coarse controller 10a controls positioning of the indicium (e.g., cursor 101) over a larger range on the display 100 than the fine controller 10b.

In the example shown in FIG. 1, the indicium is the cursor 101 on the display 100, and the coarse controller 10a controls a first relative motion parameter, while the fine controller 10b controls a second relative motion parameter. For example, in an exemplary embodiment, both controllers 10a and 10b control a position 102 of the cursor 101 on the display 100 as their respective relative motion parameters. However, each controller 10a and 10b has a different gain (i.e., ratio of the magnitude of change in cursor position to the magnitude of change in controller position) to enable the dual-positioning controller 20 to control both large cursor movements and small cursor movements. For example, coarse controller 10a can provide high-gain, low-resolution motion of the cursor 101 on the display 100, and fine controller 10b can provide low-gain, high-resolution motion of the cursor 101 on the display 100. Since the magnitude and direction of displacement of positioning controllers 10a and 10b determines the magnitude and direction of movement of the cursor 101 on the display 100, displacement of positioning controllers 10a and 10b by the same distance and in the same direction translates into different relative incremental changes in cursor position ($\Delta x$, $\Delta y$) on the display 100 based on the gain associated with each positioning controller 10a and 10b.

In an example in which the gain associated with coarse controller 10a is greater than the gain associated with fine controller 10b, a displacement of coarse controller 10a by a certain distance and in a certain direction results in a greater incremental change in position ($\Delta x$, $\Delta y$) of the cursor 101 from an original position on the display 100 than the same displacement of fine controller 10b. Therefore, coarse controller 10a produces large, less precise movements of the cursor 101 across the display 100, while fine controller 10b produces pixel-level resolution, small movements of the cursor 101 across of the display 100. The fine controller 10b can therefore be used to produce fine (small) movements of the cursor 101 to maximize cursor position accuracy and facilitate accurate "clicking" at the position 102 of the cursor 101.

In another exemplary embodiment, both positioning controllers 10a and 10b control the velocity (shown as velocity vector v) of the cursor 101 on the display 100 as their respective relative motion parameters. However, each positioning controller 10a and 10b again has a different gain to enable the dual-positioning controller 20 to control both large cursor movements and small cursor movements. For example, coarse controller 10a can be programmed to provide high-gain, low-resolution motion of the cursor 101 on the display 100, and fine controller 10b can be programmed to provide low-gain, high-resolution motion of the cursor 101 on the display 100. Thus, displacement of coarse controller 10a by a certain distance results in motion of the cursor 101 across the display 100 at a greater velocity v than the cursor velocity produced by the same displacement distance of fine controller 10b.

In yet another exemplary embodiment, coarse controller 10a controls the velocity v of the cursor as the first relative motion parameter, and fine controller 10b controls the change in position 102 ($\Delta x$, $\Delta y$) of the cursor 101 on the display 100 as the second relative motion parameter. Thus, a displacement of coarse controller 10a by a certain distance in a certain direction translates into motion of the cursor 101 across the display 100 at a particular velocity in a particular direction collectively represented by velocity vector v, while a displacement of fine controller 10b by the same distance and in the same direction as coarse controller 10a translates into an incremental change in position ($\Delta x$, $\Delta y$) of the cursor 101 on the display 100.

In a further embodiment, each positioning controller 10a and 10b controls movement of a separate cursor 101. For example, positioning controller 10a controls the movement of a first cursor 101 within a first area of the display 100, while positioning controller 10b controls the movement of a second cursor 101b within a second area of the display. As an example, coarse controller 10a can control movement of the first cursor 101 within a large region (e.g., a text entry field) on the display 100, whereas fine controller 10b can control movement of the cursor 101b within a smaller region (e.g., a menu bar) on the display. Thus, the maximum displacements of the fine controller 10b map to a region on the display, such that there is a one-to-one mapping between the fine controller 10b position and the cursor position in the region. In an example in which the fine controller 10b is a puck-type pointing device that returns to a centered position upon release of the lateral force on the puck, the cursor returns to a centered position of the region upon release of the lateral force on the puck.

In yet a further embodiment, the indicium includes a first indicium corresponding to a window 105 of content displayed on the display 100 and a second indicium corresponding to a cursor 101 confined to the window 105 of the display 100. The first relative motion parameter controls the position of the window 105 relative to the content on the display 100, while the second relative motion parameter controls the position of the cursor 101 within the window 105. In an exemplary embodiment, the window area is less than the screen area (pixel area) on the display 100, such that the first relative motion parameter controls the position of the window 105 on the screen. Thus, a displacement of the coarse controller 10a produces motion of the window 105 across the screen, while displacement of the fine controller 10b produces motion of the cursor 101 within the window 105.

In another exemplary embodiment, the window area is less than a virtual area of content (shown in FIG. 8 and described in more detail below), such that the first relative motion parameter controls the position of the window 105 relative to the content. Thus, a displacement of the coarse controller 10a produces an apparent movement of the underlying content on the display 100 to the user, while a displacement of the fine controller 10b produces movement of the cursor 101 on the display 100.

Figure 2A:
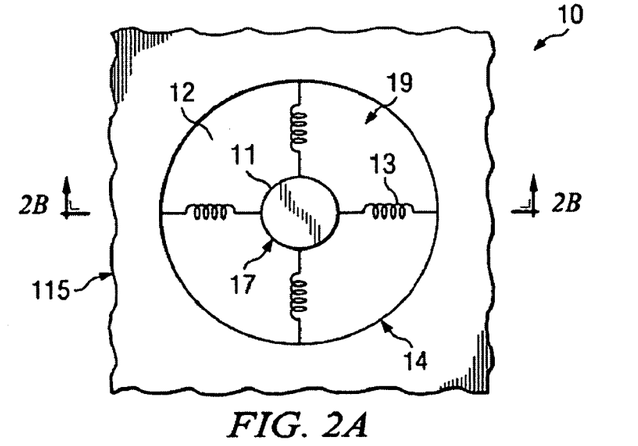
FIG. 2A is a top view of an exemplary positioning controller for controlling movement of an indicium on a display of the electronic device, in accordance with embodiments of the present invention.
Figure 2B:
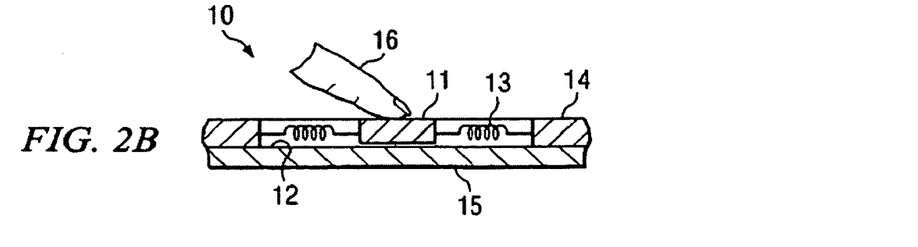
FIG. 2B is a cross-sectional view of the positioning controller of FIG. 2A, in accordance with embodiments of the present invention.

Referring now to FIGS. 2A and 2B, features of an exemplary puck-type pointing device 10 for use as one or both of the positioning controllers 10a or 10b in the dual-positioning controller 20 of FIG. 1 are illustrated. FIG. 2A is a schematic top view of the puck-type pointing device 10 and FIG. 2B is a cross-sectional view of the puck-type pointing device 10. As discussed above in connection with FIG. 1, the puck-type pointing device 10 includes a puck 11 that is moveable over a surface 12 of a substrate 115 within a puck field of motion 19 in response to a lateral force applied to the puck 11. The lateral force is typically applied to the puck 11 by a user's finger 16, thumb or multiple fingers.

In one embodiment, the puck 11 includes a pressure sensor (not shown) that measures the pressure (i.e., a force applied in a direction generally orthogonal to the surface 115) applied to the puck 11 by the user, and the puck-type pointing device 10 includes a motion sensor (not shown) that determines the displacement of the puck 11 relative to the surface 12 in response to the lateral force applied to the puck 11 by the user. In one embodiment, the pressure sensor in the puck 11 is operable to sense two predetermined pressure levels. A first pressure level activates the tracking of the indicium on the display, as described above. In addition, the activation of the tracking of the indicium on the display due to the detection of the first pressure level also activates the motion sensor. A second pressure level provides a "click" function associated with a conventional mouse. For example, a user can click at the current position of the indicium by increasing the pressure applied to the puck 11 to greater than the second pressure level. In other embodiments, a tactile feedback mechanism can also be included in the puck 11 to provide to the user tactile feedback that indicates that the user has applied pressure at or above the second pressure level to activate the "click" function.

When the user releases the puck 11 by removing the user's finger 16, the puck 11 is returned to a center position 17 by the springs 13 that connect the puck 11 to the perimeter 14 of the puck field of motion 19. The perimeter 14 of the puck field of motion 19 is typically connected to the surface 115 of the electronic device on which the puck-type pointing device 10 is located. Since the user's finger 16 is not applying pressure to the puck 11 when the puck 11 is released, the pressure sensor is not activated during the return of the puck 11 to the center position 17, and any change in position associated with the return motion may or may not reported by the motion sensor to the electronic device, depending on whether a one-to-one mapping exists between puck 11 position and indicium position.

Figures 3, 4, 5, 6:
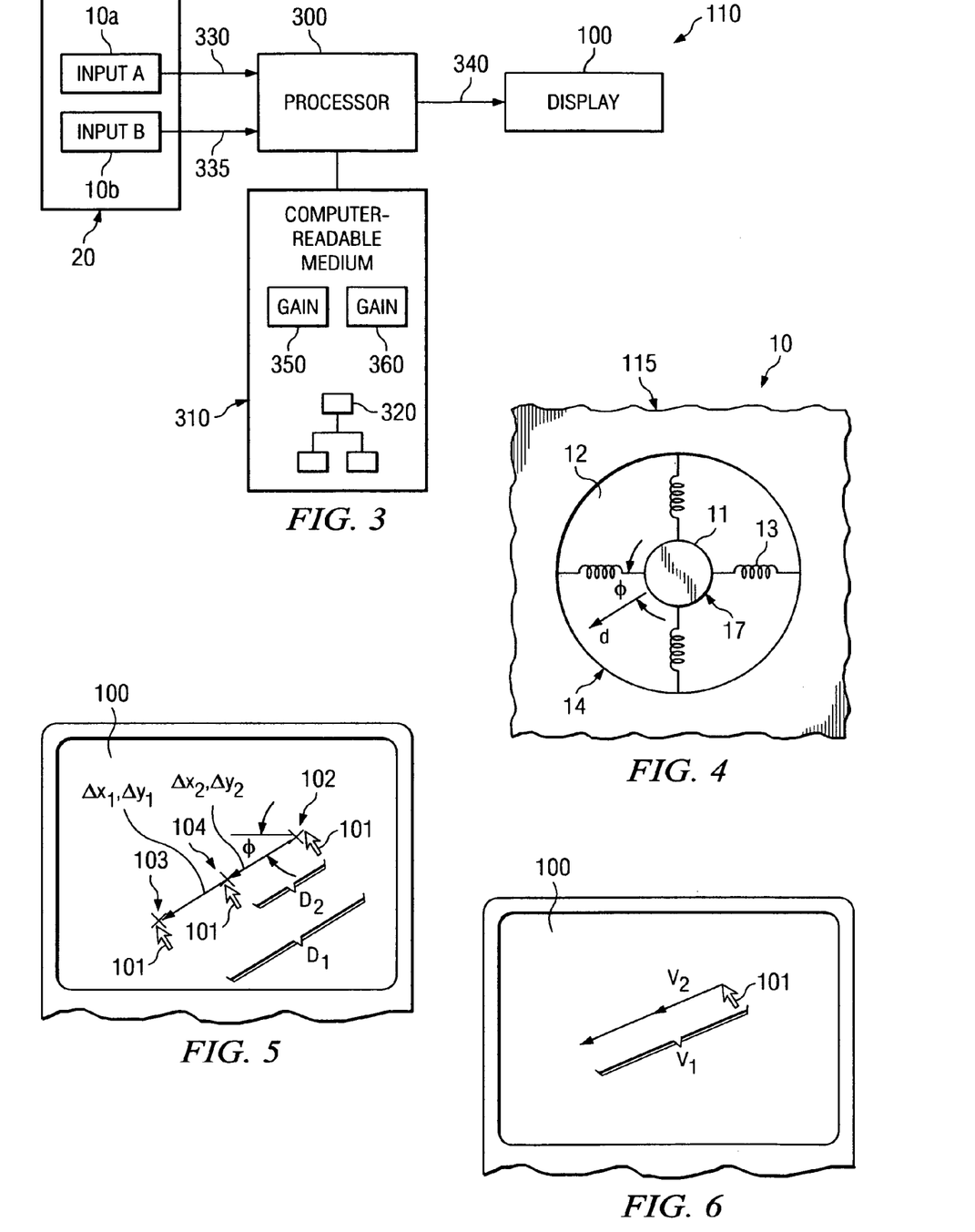
FIG. 3 is a block diagram of an exemplary electronic device capable of controlling movement of an indicium on a display of the electronic device using a dual-positioning controller, in accordance with embodiments of the present invention.
FIG. 4 illustrates displacement of a positioning controller to control the position of an indicium on the display, in accordance with embodiments of the present invention.
FIG. 5 is a pictorial representation illustrating positional control of the cursor on the display, in accordance with embodiments of the present invention.
FIG. 6 is a pictorial representation illustrating velocity control of the cursor on the display, in accordance with embodiments of the present invention.

Referring now to FIG. 3, there is illustrated various components of an exemplary electronic device 110 in which movement of an indicium on the display of the electronic device is controlled using a dual-positioning controller in accordance with embodiments of the present invention. The electronic device 110 includes a processor 300 connected to a memory device 310. The processor 300 in combination with the memory device 310 controls the operation of the electronic device 110. The processor 300 can be a microprocessor, microcontroller, programmable logic device or any other processing device. The memory device 310 can be any type of memory device for use on any type of portable and/or handheld electronic device 110. For example, the memory device 310 can be a flash ROM, EEPROM, ROM, RAM or any other type of storage device.

In one embodiment, the memory device 310 stores software 320 executable by the processor 300 to determine indicium movement. For example, the software 320 can include an algorithm for mapping displacement of one or more of the positioning controllers 10*a* or 10*b* of the dual-positioning controller 20 to an indicium change in position and/or indicium velocity based on the gain associated with the particular positioning controller 10*a* or 10*b*. In another embodiment, the algorithm is stored in the processor 300, and the memory device 310 stores data used by the processor 300 during the indicium motion process.

The electronic device 110 further includes the display 100 and the dual-positioning controller 20 containing positioning controllers 10*a* (coarse controller) and 10*b* (fine controller), as described above. The processor 300 is connected to receive a coarse position control signal 330 from coarse controller 10*a* in response to a lateral force applied to coarse controller 10*a* by a user. The coarse position control signal 330 is used by the processor 300 to determine the magnitude and direction of coarse movement (position or velocity) of the indicium on the display 100, as described above. The processor 300 is further connected to receive a fine position control signal 335 from fine controller 10*b* in response to a lateral force applied to fine controller 10*b* by a user. The fine position control signal 335 is used by the processor 300 to determine the magnitude and direction of fine movement (position or velocity) of the indicium on the display 100, as described above.

For example, in embodiments where coarse controller 10*a* controls the velocity of the cursor movement on the display 100, and fine controller 10*b* controls the relative change in position of the cursor movement on the display 100, coarse position control signal 330 is used by the processor 300 to determine the cursor velocity across the display 100, and fine position control signal 335 is used by the processor 300 to determine the change in cursor position on the display 100. The processor 300 translates the coarse position control signal 330 into a cursor velocity vector having both a magnitude (velocity) and direction, and outputs a movement signal 340 to the display 100. The movement signal 340 initiates movement of the cursor on the display 100 at the velocity and in the direction of the cursor velocity vector. Likewise, the processor 300 translates the fine position control signal 335 into an incremental change in cursor position ($\Delta x$, $\Delta y$) vector, and outputs the movement signal 340 to the display 100. The movement signal 340 initiates movement of the cursor on the display 100 from a current position (x, y) on the display 100 to the new position (x+$\Delta x$, y+$\Delta y$) on the display 100 based on the incremental change in position vector.

In other embodiments where both positioning controllers 10*a* and 10*b* control either cursor position or cursor velocity, the memory device 310 stores a first gain 350 associated with positioning controller 10*a* and a second gain 360 associated with positioning controller 10*b*. As described above, coarse position control signal 330 indicates the magnitude and direction of movement (e.g., displacement of the puck from the center position) of positioning controller 10*a*, and fine position control signal 335 indicates the magnitude and direction of movement (e.g., displacement of the puck from the center position) of positioning controller 10*b*. The processor 300 translates the coarse position control signal 330 into either a cursor velocity vector or an incremental change in cursor position using the first gain 350, and translates the fine position control signal 335 into either a cursor velocity vector or an incremental change in cursor position using the second gain 360, and outputs the movement signal 340 to the display 100. The movement signal 340 initiates movement of the cursor on the display 100.

To provide both large-scale cursor movements and small-scale cursor movements, the first gain 350 is greater than the second gain 360. Therefore, if control signals 330 and 335 are substantially the same, indicating substantially the same magnitude and direction of movement of each positioning controller 10*a* and 10*b*, the movement signal 340 based on coarse position control signal 330 initiates movement of the cursor on the display at a greater velocity or with a greater displacement than the movement signal 340 based on fine position control signal 335. Thus, when the first gain 350 is applied to coarse position control signal 330 by the processor 300, the resulting movement signal 340 produces large (low-resolution) movements of the cursor across the display 100. Likewise, when the second gain 360 is applied to fine position control signal 335 by the processor 300, the resulting movement signal 340 produces small (high-resolution) movements of the cursor across the display 100.

Furthermore, in embodiments in which the coarse controller 10*a* controls the position of a window relative to content on the display 100 as one element of the indicium and the fine controller 10*b* controls the position of the cursor within the window as another element of the indicium, the processor 300 translates the coarse position control signal 330 into an incremental change in position of the window and outputs the movement signal 340 to the display 100 to initiate movement of the window on the display. The processor 300 further translates the fine position control signal 335 into an incremental change in cursor position within the window, and outputs the movement signal 340 to the display 100 to initiate movement of the cursor within the window on the display 100.

To prevent motion of the indicium as a result of inadvertent displacement of one of the positioning controllers 10*a* or 10*b* by the user, the processor 300 is further operable to prevent simultaneous processing of both control signals 330 and 335. Thus, if the coarse position control signal 330 is being received at the processor 300, the fine control signal 335 present at the input of the processor 300 is not processed, and vice-versa. In an additional embodiment, the processor 300 is programmed to inhibit processing one of the control signals for a predetermined time after discontinuance of the other control signal. In another embodiment, the processor 300 is programmed to prioritize processing one of the control signals 330 or 335 relative to the other control signal. In an example in which the processor 300 is programmed to prioritize the coarse position control signal 330, fine position control signals 335 received during the receipt of a coarse position control signal 330 are ignored, while coarse position control signals 330 received during the receipt of fine position control signals 335 are processed (i.e., the fine position control signals 335 are ignored).

FIG. 4 illustrates displacement of the puck-type pointing device of FIGS. 2A and 2B to control the position of an indicium on the display, in accordance with embodiments of the present invention. As discussed above, when the user applies pressure to the puck 11 that is greater than the predetermined first pressure level, any change in the lateral position of the puck 11 relative to the surface 12 is sensed by the motion sensor and reported to the electronic device of which the puck-type pointing device 10 forms a part. The reported change in position is used by the electronic device to move an indicium on the display based on the magnitude and direction of the motion of the puck 11. In FIG. 4, a vector representing the motion of the puck 11 is characterized by a magnitude d and a direction defined by an angle φ on the puck-type pointing device 10.

When the user releases the pressure on the puck 11, the puck 11 is returned to its centered position 17 by the springs 13 attached to the puck 11. In one embodiment, without pressure applied to the puck 11, the pressure sensor inhibits the motion sensor from reporting the change in position of the puck 11 to the electronic device. In embodiments in which there is a one-to-one mapping between the puck 11 position and the indicium position, the change in position of the puck 11 when the user releases the pressure on the puck 11 is reported to the electronic device.

Referring now to FIG. 5, in embodiments in which the dual-positioning controller includes two puck-type pointing devices, where each puck-type pointing device controls cursor position, displacement of the puck of either puck-type pointing device translates into a change in position of the cursor 101 on the display 100 dependent upon the gain associated with each puck-type pointing device. The gain determines the distance the cursor 101 moves on the display 100 for a particular displacement of the puck.

For example, as shown in FIG. 5, displacement of the first puck within the first puck field of motion by a distance d and in a direction φ shown in FIG. 4 produces motion of the cursor 101 from a current position 102 to a first new position 103 on the display 100 based on the gain associated with the first puck-type pointing device. The cursor motion produced by the first puck-type pointing device is represented by a vector characterized by a magnitude $D_1$ and a direction defined by an angle φ on the display 100. The displacement of the first puck translates into a first incremental change in the position of the cursor 101 ($\Delta x_1$, $\Delta y_1$) on the display 100. In embodiments where the pressure sensor inhibits the motion sensor from reporting the change in position of the puck to the electronic device when the user releases the pressure on the puck, the cursor 101 remains at position 103.

In contrast, displacement of the second puck within the second puck field of motion by the same distance d and in the same direction φ shown in FIG. 4 produces motion of the cursor 101 from a current position 102 to a second new position 104 on the display 100 based on the gain associated with the second puck-type pointing device. The cursor motion produced by the second puck-type pointing device is represented by a vector characterized by a magnitude $D_2$ and a direction defined by an angle φ on the display 100. Thus, the displacement of the second puck translates into a second incremental change in position of the cursor 101 ($\Delta x_2$, $\Delta y_2$) on the display 100. In FIG. 5, the gain of the second puck-type pointing device is less than the gain of the first puck-type pointing device, and therefore, the magnitude $D_2$ is less than the magnitude $D_1$, and the second incremental change in position of the cursor 101 ($\Delta x_2$, $\Delta y_2$) is less than the first incremental change in position of the cursor 101 ($\Delta x_1$, $\Delta y_1$).

FIG. 6 is a pictorial representation illustrating the velocity control of the cursor on the display, in accordance with embodiments of the present invention. FIG. 6 illustrates two cursor velocities produced by the same displacement of two different puck-type pointing devices based on the gain associated with each puck-type pointing device. As shown in FIG. 6, displacement of the first puck within the first puck field of motion by a distance d and in a direction φ shown in FIG. 4 results in motion of the cursor 101 across the display 100 at a first velocity $v_1$, and displacement of a second puck within a second field of motion by the same distance d and in the same direction φ shown in FIG. 4 results in motion of the cursor across the display at a second velocity $v_2$, which is less than the cursor velocity $v_1$ produced by the first puck-type pointing device.

Figure 7:
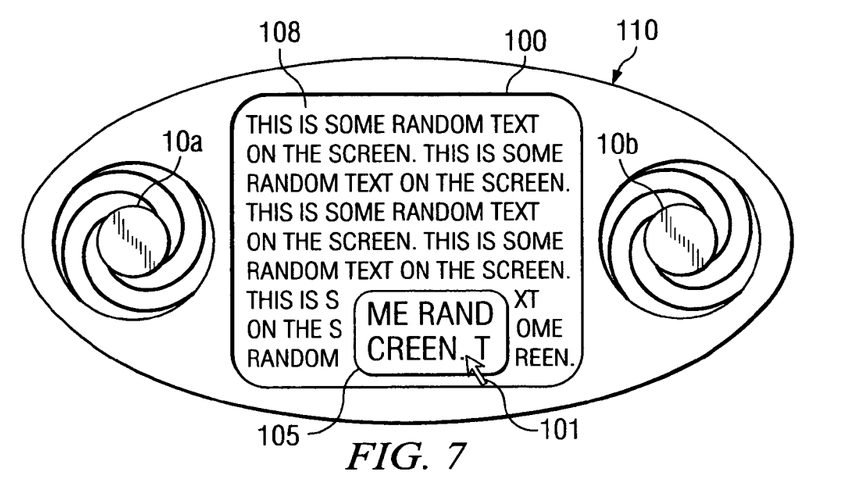
FIG. 7 is a pictorial representation illustrating positional control of a window and the cursor on the display, in accordance with embodiments of the present invention.

FIG. 7 is a pictorial representation of an electronic device 110 including a display 100 having an exemplary window 105 of content 108 displayed thereon, in accordance with embodiments of the present invention. In FIG. 7, the area of the window 105 is less than the screen area of the display 100, and includes a portion of the content 108 that is magnified on the display 100 relative to the rest of the content 108 displayed on the display 100. The magnification of the content 108 within the viewed area 105 facilitates reading of the content and cursor position accuracy relative to the content 108. Although the content 108 is illustrated as text in FIG. 7, in other embodiments, the content 108 includes all or part of any type of document, picture or other data capable of being displayed on the display 100.

In FIG. 7, each positioning controllers 10a and 10b controls movement of a different element of the indicium on the display 100. For example, the coarse controller 10a controls movement of the window 105 on the display 100 as the first element of the indicium and the fine controller 10b controls movement of the cursor 101 within the window 105 on the display 100 as the second element of the indicium. Thus, the window 105 can be moved across the display 100 to magnify any portion of the content 108 displayed on the display 100 using coarse controller 10a, and the cursor 101 can be moved to any position within the window 105 using fine controller 10b.

Figure 8:
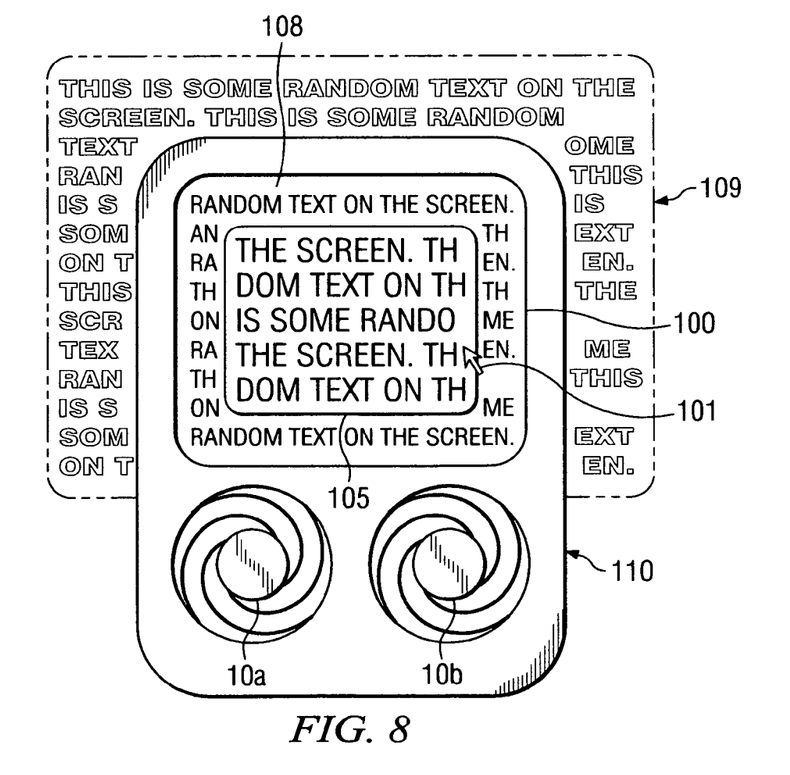
FIG. 8 is a pictorial representation illustrating positional control of a window relative to content on the display, in accordance with embodiments of the present invention.

FIG. 8 is a pictorial representation of an electronic device 100 including a display 100 having a fixed window 105 of content 108 displayed thereon, in accordance with embodiments of the present invention. In FIG. 8, the window 105 is shown occupying a central area on the display 100 whose position on the display 100 is fixed. Only a portion of the content 108 is displayed on the display 100. However, in other embodiments, the window 105 can be located at any fixed position on the display 100.

In FIG. 8, the area of window 105 is less than a virtual area 109 of content 108, such that the positioning controllers 10a and 10b control the position of the content 108 relative to window 105. For example, positioning controller 10a is programmed to control movement of the virtual area 109 of content relative to window 105 (e.g., slide the content 108 underneath the window 105) as a first element of the indicium, and positioning controller 10b is programmed to control movement of the cursor 101 within the window 105 on the display 100 as a second element of the indicium. Thus, a displacement of the coarse controller 10a produces an apparent movement of the underlying content 108 in the window 105 on the display 100 to the user, while a displacement of the fine controller 10b produces motion of the cursor 101 to any position within the window 105.

In one embodiment, as shown in FIG. 8, the window 105 area is less than the screen area of the display 100, and content 108 is displayed in window 105 magnified relative to content outside the window 105. In other embodiments, the window 105 is less than or equal to the screen area of the display 100, and the content 108 displayed within the window 105 is not magnified.

Figure 9:
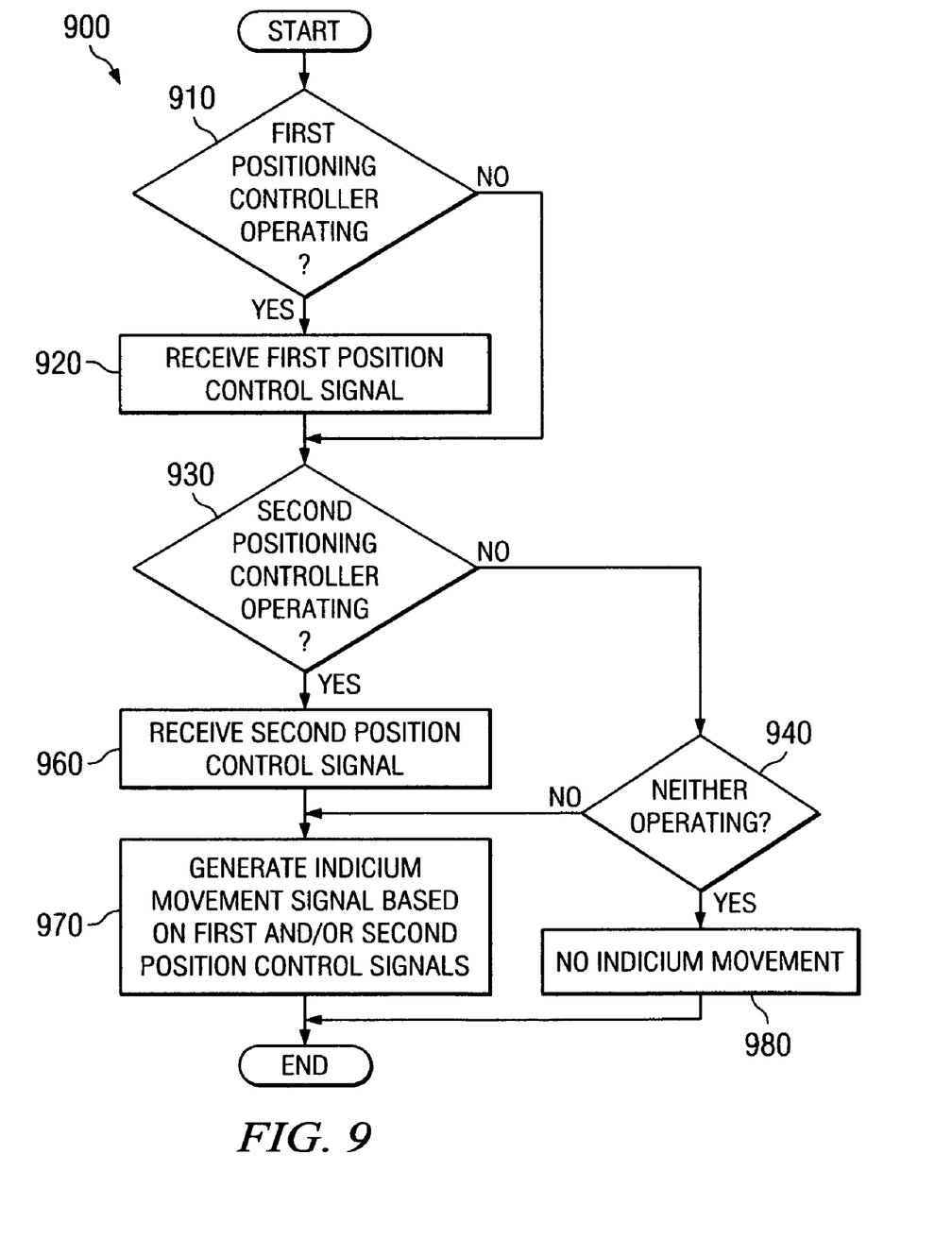
FIG. 9 is a flow chart illustrating an exemplary process for controlling movement of an indicium on a display of an electronic device, in accordance with embodiments of the present invention.

FIG. 9 is a flow chart illustrating an exemplary process 900 for controlling movement of an indicium on a display of an electronic device using a dual-positioning controller having two positioning controllers in accordance with embodiments of the present invention. At block 910, if a first positioning controller of the dual-positioning controller is operating, a first position control signal is received from the first positioning controller at block 920. However, if the first positioning controller is not currently operating, but the second positioning controller is operating at block 930, a second position control signal is received from the second positioning controller at block 960. Based on the received first and/or second position control signal, an indicium movement signal is generated at block 970 to control the magnitude and direction of movement of the indicium on the display of the electronic device associated with the dual-positioning controller. However, at block 940, if neither positioning controller is in operation, at block 950, there is no indicium movement on the display.

The innovative concepts described in the present application can be modified and varied over a wide rage of applications. Accordingly, the scope of patents subject matter should not be limited to any of the specific exemplary teachings discussed, but is instead defined by the following claims.

We claim:

1. A dual-positioning controller for controlling movement of an indicium on a display of an electronic device, said dual-positioning controller comprising:
   a coarse controller for controlling a first relative motion parameter producing coarse movement of said indicium relative to content displayed on said display, said coarse controller being a first puck-type pointing device including a first surface having a first puck field of motion defined thereon and a first moveable puck operable to move within said first puck field of motion, wherein a displacement of said first moveable puck within said first puck field of motion produces said coarse movement; and
   a fine controller for controlling a second relative motion parameter producing fine movement of said indicium relative to said content on said display, said fine controller being a second puck-type pointing device including a second surface having a second puck field of motion defined thereon and a second moveable puck operable to move within said second puck field of motion, wherein a displacement of said second moveable puck within said second puck field of motion produces said fine movement,
   wherein said indicium comprises a cursor displayed on said display and wherein first relative motion parameter is a velocity of said cursor on said display, said velocity of said cursor being determined exclusively by the distance and the direction of a displacement of said coarse controller.

2. The dual-positioning controller of claim 1, wherein said second relative motion parameter is an incremental change in position of said cursor on said display.

3. The dual-positioning controller of claim 1, wherein both said first relative motion parameter and said second relative motion parameter are velocities of said cursor, and wherein said first relative motion parameter has a first gain for producing a first velocity of said cursor on the display and said second relative motion parameter has a second gain less than said first gain for producing a second velocity of said cursor on the display, said second velocity having a magnitude less than said first velocity.

4. An electronic device, comprising:
   a display having an indicium and content displayed thereon;
   a dual-positioning controller for controlling movement of said indicium on said display, said dual-positioning controller including:
      a coarse controller for providing a coarse position control signal for controlling coarse movement of said indicium relative to said content displayed on said display, said coarse controller being a first puck-type pointing device including a first surface having a first puck field of motion defined thereon and a first moveable puck operable to move within said first puck field of motion, wherein a displacement of said first moveable puck within said first puck field of motion produces said coarse movement, and
      a fine controller for providing a fine position control signal for controlling fine movement of said indicium relative to said content on said display, said fine controller being a second puck-type pointing device including a second surface having a second puck field of motion defined thereon and a second moveable puck operable to move within said second puck field of motion, wherein a displacement of said second moveable puck within said second puck field of motion produces said fine movement; and
   a processor operable to receive said first position control signal and said second position control signal and move said indicium on said display relative to said content in response to said first position control signal and said second position control signals,
   wherein said display displays content thereon and said indicium includes a first indicium element comprising a window displayed on said display and a second indicium element comprising a cursor displayed on said display, the area of said window being less than a screen area of said display, wherein said processor is operable in response to said coarse position control signal to move said window relative to said screen area of said display; and wherein said processor is further operable in response to said fine position control signal to move said cursor within said window on said display.

5. The electronic device of claim 4, wherein said processor is further operable to use said coarse position control signal to move said indicium on said display by a velocity and to use said fine position control signal to move said indicium on said display by an incremental change in position.

6. The electronic device of claim 4, wherein said processor is further operable to apply said coarse position control signal to a first gain to move said first indicium element on said display by a first incremental change in position; and wherein said processor is further operable to apply said fine position control signal to a second gain less than said first gain to move said second indicium element on said display by a second incremental change in position having a magnitude less than said first incremental change in position.

7. The electronic device of claim 4, wherein said processor is further operable to apply said coarse position control signal to a first gain to move said first indicium element across said display with a first velocity; and wherein said processor is further operable to apply said fine position control signal to a second gain less than said first gain to move said second indicium element across said display by a second velocity having a magnitude less than said first velocity.

8. The electronic device of claim 4, wherein:
   wherein said window includes a magnified portion of said content magnified on said display relative to a remaining portion of said content displayed on the display.

9. A method for controlling movement of an indicium on a display of an electronic device, said method comprising:
   receiving at least one of a coarse position control signal from a coarse controller for controlling coarse movement of said indicium on said display and a fine position control signal from a fine controller for controlling fine movement of said indicium on said display, said coarse controller being a first puck-type pointing device including a first surface having a first puck field of motion defined thereon and a first moveable puck operable to move within said first puck field of motion, wherein a displacement of said first moveable puck within said first puck field of motion produces said coarse movement, said fine controller being a second puck-type pointing device including a second surface having a second puck field of motion defined thereon and a second moveable puck operable to move within said second puck field of motion, wherein a displacement of said second moveable puck within said second puck field of motion produces said fine movement; and moving said indicium on said display relative to content displayed on said display based on at least one of said coarse position control signal and said fine position control signal, wherein said display displays content thereon and wherein said indicium includes a first indicium element comprising a window displayed on said display and a second indicium element comprising a cursor displayed on said display, the area of said window being less than a screen area of said display, and wherein said moving said indicium further comprises:

in response to receipt of said coarse position control signal, moving said window relative to said screen area of said display; and in response to receipt of said fine position control signal, moving said cursor within said window on said display.

10. The method of claim 9, wherein said moving said indicium further comprises:

in response to receipt of said coarse position control signal, moving said first indicium element across said display at a velocity determined from said coarse position control signal; and in response to receipt of said fine position control signal, moving said second indicium element on said display by an incremental change in position determined from said fine position control signal.

11. The method of claim 9, wherein said moving said indicium further comprises:

in response to receipt of said coarse position control signal, moving said first indicium element on said display by a first incremental change in position determined from said coarse position control signal; and in response to receipt of said fine position control signal, moving said second indicium element on said display by a second incremental change in position determined from said fine position control signal, said second incremental change in position having a magnitude less than said first incremental change in position.

12. The method of claim 9, wherein said moving said indicium further comprises:

in response to receipt of said coarse position control signal, moving said first indicium element on said display at a first velocity determined from said coarse position control signal; and in response to receipt of said fine position control signal, moving said second indicium element on said display at a second velocity determined from said fine position control signal, said second velocity having a magnitude less than said first velocity.

13. The method of claim 9, wherein said window includes a magnified portion of said content magnified on said display relative to a remaining portion of said content displayed on the display.

* * * * *

UNITED STATES PATENT AND TRADEMARK OFFICE
CERTIFICATE OF CORRECTION

| | | |
|---|---|---|
| PATENT NO. | : 7,576,726 B2 | Page 1 of 1 |
| APPLICATION NO. | : 11/136939 | |
| DATED | : August 18, 2009 | |
| INVENTOR(S) | : Jonah Harley et al. | |

It is certified that error appears in the above-identified patent and that said Letters Patent is hereby corrected as shown below:

Column 12, Line 23, Claim 4, delete "signals," and insert --signal,--.

Signed and Sealed this
Twenty-fifth Day of September, 2012

David J. Kappos
*Director of the United States Patent and Trademark Office*